United States Patent [19]

Richardson

[11] 4,444,074
[45] Apr. 24, 1984

[54] METHOD AND APPARATUS FOR RESURFACING STEEL TIRES

[75] Inventor: Robert S. Richardson, Columbia Heights, Minn.

[73] Assignee: R.S.D. Investments Inc. DBA Proto, St. Paul, Minn.

[21] Appl. No.: 340,503

[22] Filed: Jan. 18, 1982

[51] Int. Cl.³ .............................................. B23B 5/00
[52] U.S. Cl. .................................................... 82/4 R
[58] Field of Search ....................... 82/7, 8, 4 E, 4 R

[56] References Cited

U.S. PATENT DOCUMENTS

| | | | |
|---|---|---|---|
| 759,644 | 5/1904 | Sturtevant | 82/4 R |
| 1,006,871 | 10/1911 | Nystrom | 82/4 R |
| 1,085,710 | 2/1914 | Tyler et al. | 82/4 R |
| 1,486,474 | 3/1924 | Baker | 82/4 R |
| 1,518,563 | 12/1924 | Claybourn | 82/4 R |
| 1,567,472 | 12/1925 | Skiles | 82/4 R |
| 2,084,040 | 6/1937 | Mirfield | 82/4 R |
| 2,145,194 | 1/1939 | Backer . | |
| 2,519,087 | 8/1950 | Tydeman . | |
| 3,264,911 | 8/1966 | Crider . | |

FOREIGN PATENT DOCUMENTS 498894  1/1939  United Kingdom ................. 82/4 R

OTHER PUBLICATIONS

Phillips Kiln Service Advertisement.

*Primary Examiner*—Leonidas Vlachos
*Assistant Examiner*—Jerry Kearns
*Attorney, Agent, or Firm*—James V. Harmon

[57] ABSTRACT

A method is described for resurfacing a steel tire of the type that encircle a material processing drum and is supported upon rollers journaled for rotation below the drum. A cutting tool is mounted below the drum. If out of round, the tire is first trued to approximate a cylinder. While the drum rotates, the tool is advanced across the outer surface of the tire along a first path from a beginning point at one edge to remove a portion of the material from the tire but without producing a finished surface as the drum settles down onto the rollers. A second cut is made, preferably in the reverse direction. A third cut is then preferably made from the point of beginning to the center to produce a finished surface. The invention also provides a resurfacing apparatus which includes a base upon which is supported a tool backing plate and an adjustable tool holder mounted on a slide plate connected to the backing plate. A feed screw is operatively connected between the slide plate and the tool holder to advance the tool along a fixed path across the tire.

4 Claims, 12 Drawing Figures

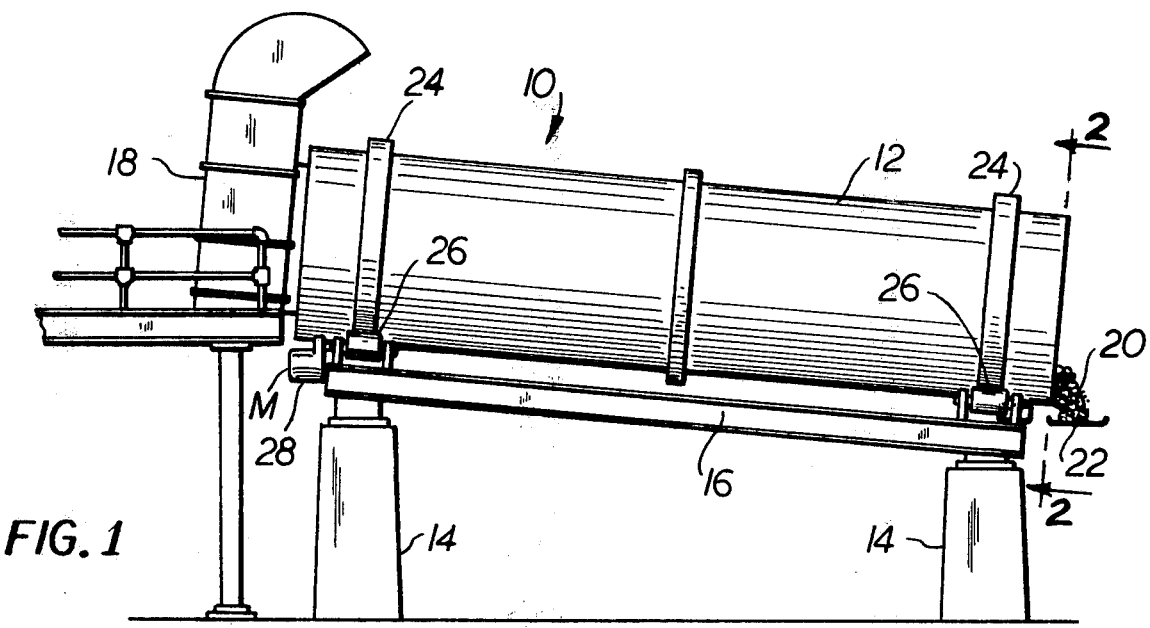
FIG. 1
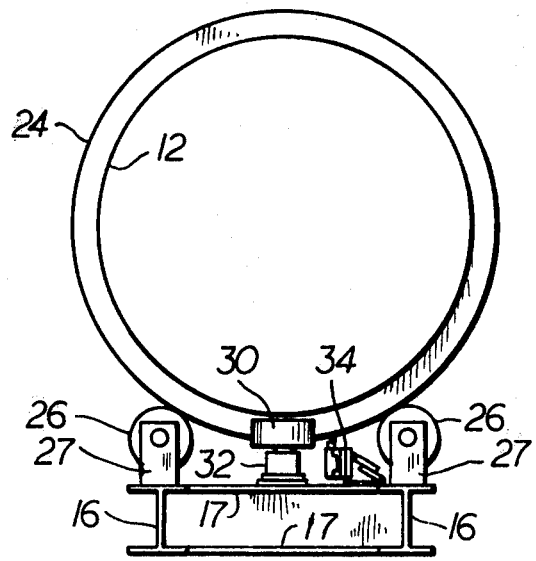
FIG. 2
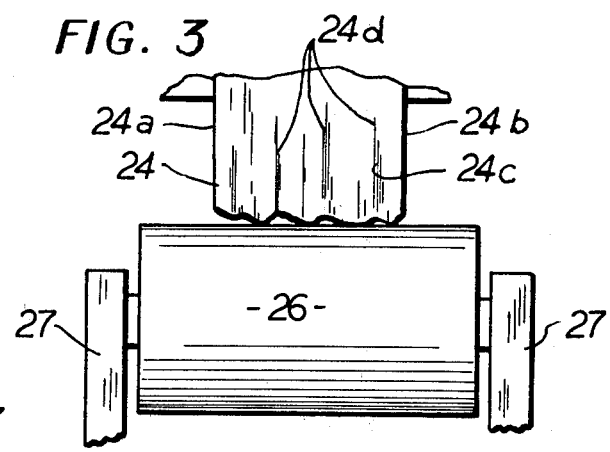
FIG. 3
FIG. 7A
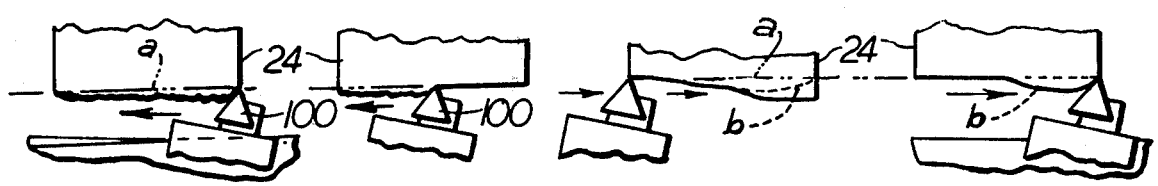
FIG. 4    FIG. 5    FIG. 6    FIG. 7

METHOD AND APPARATUS FOR RESURFACING STEEL TIRES

FIELD OF THE INVENTION

The invention relates to the repair of heavy machinery and more particularly to a method and apparatus for resurfacing steel tires used in rotating machinery while the machinery is in operation.

THE PRIOR ART

In many commercial processes such as asphalt mixing, rock crushing, ore processing, cement and concrete manufacture, and the like, material is processed in a large rotating steel drum encircled at two or more points along its length by steel rings or tires. These tires are fastened to the drum and turn with it. The tires are supported by rollers journaled on a supporting framework beneath the drum. During use, the surface of the tire engaging the rollers becomes scored and worn. Sometimes the tire is worn near the edges producing a crown at the center. In other cases the center may be worn more than the edges or one edge may be worn more than the other. Repairing these tires has been very expensive. The tires are often from eight to twelve feet in diameter and the drums may weigh as much as 50,000 lbs. It has been common practice in the asphalt mixing industry to periodically shut down the equipment, remove the worn tires and replace them with new ones. In addition to the expense, this is time consuming and places the equipment out of commission for a period of time. Attempts have been made to resurface the tires by pressing a fixed abrasive stone against it as it rotates. This, however, has not been satisfactory since the stone wears to conform to the tire leaving irregularities in its surface.

OBJECTS

In view of these and other deficiencies of the prior art, it is an objective of the present invention to provide an improved method and apparatus for resurfacing steel tires with the following characteristics and advantages:
a. Resurfacing can be conducted without dismantling the machinery.
b. Tires twelve or more feet in diameter encircling drums weighing as much as 50,000 lbs. or more can be reliably resurfaced.
c. Resurfacing can be reliably conducted although the tire descends toward its supporting rollers as material is cut from its surface.
d. Provision is made for either manually or automatically advancing the cutting tool although the apparatus is placed so closely to machine parts that portions of the apparatus cannot be reached.
e. Provision is made for selectively changing and releasably locking (1) the cutting angle of the tool, (2) the rake of the tool and (3) its path of travel.
f. Still another objective is to find a way to provide a cutting tool that will accomplish all of the above objectives and yet have a height of about six inches or less so that it can be used in the confined spaces found around the rotating parts of machines where there may be only a few inches of clearance between the supporting framework and the parts that require resurfacing.

SUMMARY OF THE INVENTION

A method is described for resurfacing steel tires used in supporting heavy rotating components of a machine such as the steel tires that encircle asphalt mixing drums. Tires of this kind are supported upon rollers journaled for rotation below the drum. First, a cutting tool is mounted below the drum. If the tire is out of round, the tool is used first to true it up to approximate the shape of a cylinder. As the drum rotates, the tool is advanced to make a first cut from a point of beginning at one edge across the outer surface of the tire along a fixed path positioned to remove only a portion of the material that is to be cut from the tire. As material is removed, the drum settles onto the rollers. A second cut is then made without changing the tool position, preferably in the reverse direction. Most preferably the finished surface is then produced by making a third cut from the point of beginning to the center.

The invention also provides a resurfacing apparatus that includes a base upon which is supported a tool backing plate and an adjustable tool holder mounted on a slide plate connected to the backing plate. A feed screw is operatively connected between the slide plate and the tool holder to advance the tool on a fixed path across the tire.

THE FIGURES

FIG. 1 is a side elevational view of a material processing machine of the type utilizing steel tires requiring resurfacing.

FIG. 2 is an end view of the drum and its supporting structure on an enlarged scale taken on line 2—2 of FIG. 1.

FIG. 3 is a partial enlarged side elevational view of the tire and roller as seen from the right side of FIG. 2.

FIGS. 4 through 7A are diagrams showing successive stages of resurfacing a tire in accordance with the invention.

DETAILED DESCRIPTION

Figure 8:
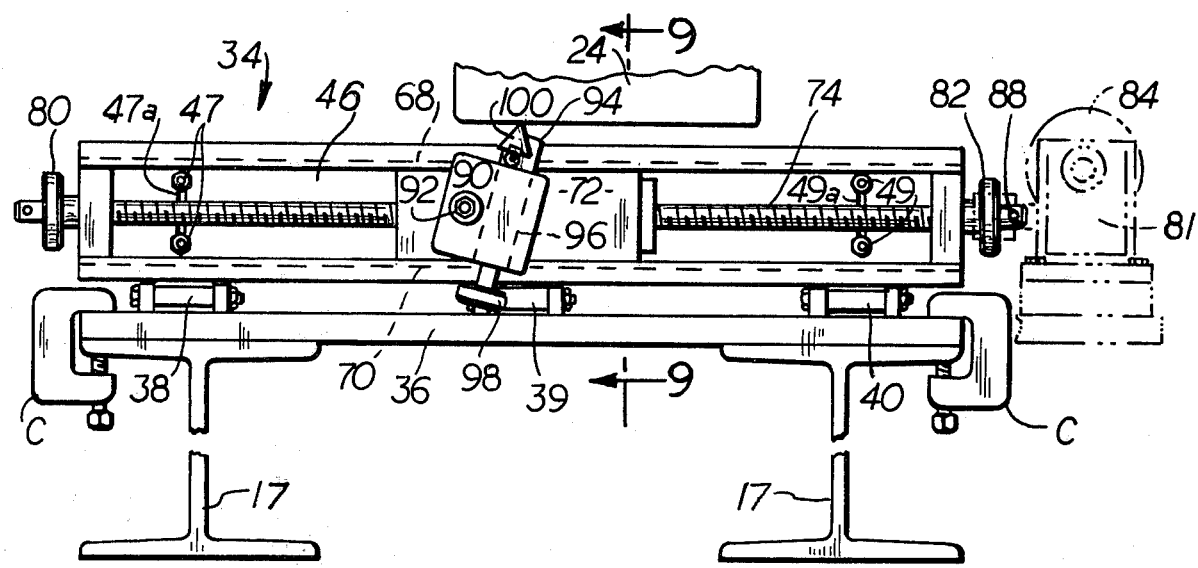
FIG. 8 is an enlarged elevational view of the resurfacing apparatus as seen from its left side in FIG. 2.
Figure 9:
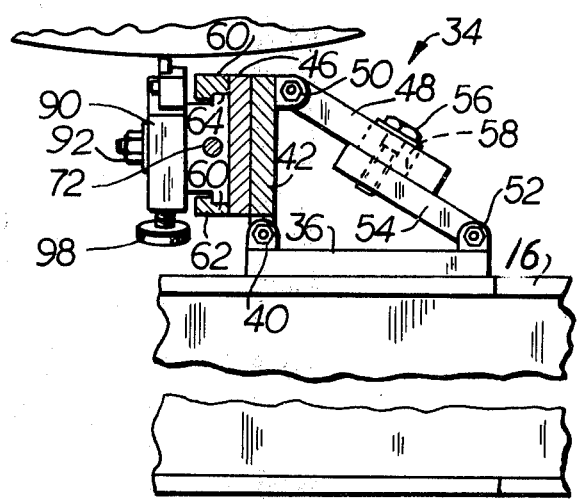
FIG. 9 is a vertical sectional view taken on line 9—9 of FIG. 8.

Refer now to the figures and particularly to FIGS. 1 and 2 which illustrate a materials processing machine 10 having a hollow rotating processing drum 12. While the invention can be employed in connection with a variety of processing machines utilizing steel tires, the invention will be described in connection with asphalt mixing equipment. In an asphalt plant, in addition to the drum 12, are supporting columns 14 at each end of the drum. Between the columns extend a pair of slightly inclined parallel transversely spaced apart beams 16. Steel binders 17 are connected as by welding between the beams 16 as shown in FIGS. 2 and 8. The beams 16 are located immediately below the drum and in practice are oftentimes spaced only a few inches, usually about six inches, below the drum. At the left end of the machine 10 as seen in FIG. 1 is a conveyor for supplying the gravel to the asphalt plant. Upon leaving the conveyor, gravel enters the left end of the drum 12 through its open end. In operation, as the drum 12 rotates, liquid asphalt is introduced at the right end of the drum. Heat is also provided. In this way, the gravel is uniformly mixed with the hot liquid asphalt to produce finished asphalt 20 which falls from the open right end of the drum onto a conveyor or other collection means 22. Encircling the drum are a pair of steel tires 24 which typically comprise rings having parallel side walls 24a and 24b (FIG. 3) about ten inches apart. As shown best in FIG. 3, the outer surface 24c of the tires 24 after months of use becomes uneven and often exhibits score lines 24d.

As shown in FIGS. 1 through 3, the tires 24 rest upon a pair of laterally spaced apart rollers 26 each journaled for rotation in a pair of bearing blocks 27 at each end, only two of which can be seen in FIG. 2. The bearing blocks 27 in turn are securely fastened, e.g. by welding to the beams 16. At least one of the rollers 26 is power driven, e.g. by means of an electric motor 28 (FIG. 1). The rotation of the driven rolls in turn causes the tires and drum to rotate while the equipment is in use. One or more thrust rollers 30 (FIG. 2) are journaled beneath the drum on a thrust roller bearing 32 which is itself securely fastened as by welding to one of the binders 17 extending between the beams 16. As can be seen, the rollers 26, tires and drum all rotate on an axis at substantially the center of the drum which is inclined downwardly at a small angle about 10° to the horizontal proceeding from the upper inlet end of the drum at the left to the lower outlet end at the right. This helps move the asphalt through the drum toward the outlet. Roll 30 takes up the thrust exerted by the drum and maintains the tires 24 in place on the rolls 26.

The equipment described thus far is conventional and by itself forms no part of the present invention. The invention which will now be described was developed to refinish the outer surface 24c of the tires 24.

Figure 10:
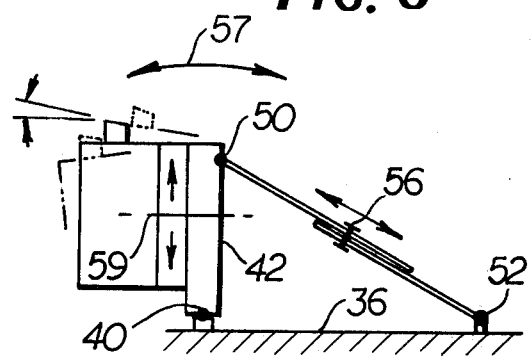
FIG. 10 is a diagram showing the several axes upon which the tool can be moved.
Figure 11:
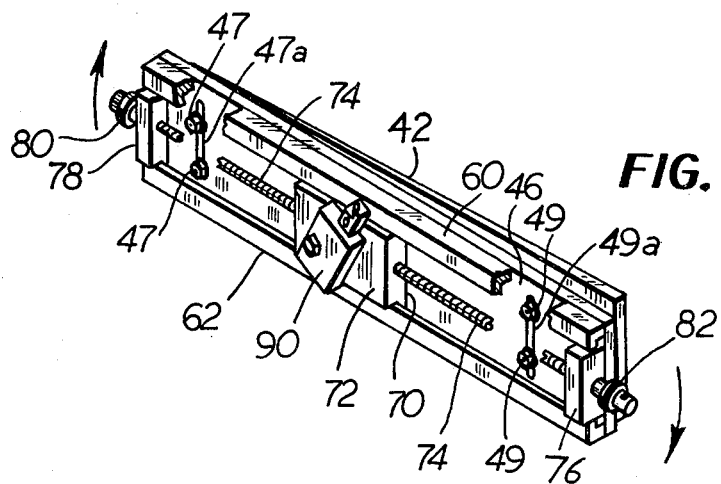
FIG. 11 is a perspective view of the tool backing plate and the parts supported by it.

The tire resurfacing apparatus of the present invention will now be described. The apparatus indicated generally at 34 is mounted during operation in a relatively small confined and often somewhat inaccessible space beneath the drum 12, preferably between the rolls 26 (FIG. 2). As shown in FIGS. 8–11, the resurfacing tool 34 includes a generally rectangular base plate 36 which can conveniently be held in place by temporary fasteners such as two clamps C, each secured to one of the beams 16. In a typical situation, the base plate 36 comprises a rectangular steel plate measuring one inch×six inches wide and 28 inches long. Pivotally connected to the base plate 36 by means of three longitudinally spaced apart pivots 38, 39 and 40, is an elongated substantially vertically disposed backing plate 42. Secured to the backing plate 42 by the provision of locking means such as cap screws 47 and 49 is a generally rectangular elongated tool support plate 46. Screws 47 and 49 allow adjustment of both tool height and the path taken by the tool. Plate 46 can be moved with respect to the backing plate 42 and locked in the desired position. To this end the support plate includes a vertically disposed slot 47a for the cap screws 47 and a slot 49a for the cap screws 49. Thus, if the plate 46 is to be pivoted upwardly at its left end as seen in FIGS. 10 and 11, about a center axis 59, the screws 47 and 49 are loosened, the left end of plate 46 is raised, its right end lowered and the cap screws retightened.

To control the rake of the tool a brace is provided including an upper brace section 48 pivoted to the backing plate 42 at 50 and lower brace section 54 is pivoted at 52 to the base 36. The overlapping center portions of the brace sections are releasably locked together by a fastener such as a cap screw extending through an elongated slot 58 in the upper brace section 48 and threaded into the lower brace section 54. The brace also supports the pressure exerted by the workpiece against the tool during the cutting operation.

Securely fixed on the support plate 46 are longitudinally extending parallel upper and lower vertically spaced apart gibs 60 and 62 which define ways 64 and 66 for upper and lower flanges 70 (only one of which is shown in FIG. 11) that extend from a slide plate 72. During operation, the slide plate 72 is moved to the left or right within the ways 64, 66 by turning a feed screw 74 which is itself threaded through an opening in the slide plate 72 and journaled for rotation in bearing blocks 76 and 78 which are in turn rigidly secured to opposite ends of the support plate 46. Each end of the feed screw extends through the blocks 76, 78 and has connected to it a hand wheel 80, 82 so that the feed screw 74 may be advanced manually as required periodically from either end. The hand wheel at each end makes it possible to control the operation of the tool even though it may be located in an extremely confined and obstructed location.

If desired, the feed screw can be advanced automatically by means of a suitable drive 84 (FIG. 8) which in this instance comprises a stepping motor connected through a speed reducer 86 and right angle drive to a flexible coupling 88 that is secured to the right end of the feed screw as seen in FIG. 8.

On the slide plate 72 is a tool holder 90 that comprises a rectangular block secured in place by a releasable fastener such as a nut and bolt assembly 92 extending through a hole in the tool holder 90. Thus, by tightening the nut 92 the tool holder 90 can be locked in place at any desired angle with respect to the horizontal to obtain the desired cutting characteristics. A tool 94 extends through a vertical bore 96 within the tool holder 90 and is moved up or down, i.e. toward or away from the workpiece by means of a tool positioning screw 98 threaded in the tool holder 90. By turning the screw 98, the tool 94 can be extended or retracted as desired with respect to the tool holder to control the depth of cut.

Replaceably mounted on the free end of the tool holder 94 is a cutter or cutting insert 100 of any suitable construction but preferably composed of tungsten carbide with a titanium coating. The cutting insert 100 as shown has six points, each of which is used in succession as the cutter becomes worn.

Refer now to FIG. 10 which illustrates the provisions made for changing the tool position and its cutting characteristics. Pivots 38, 39 and 40 (only the last of which is shown), cooperating with the brace 48, enable the rake of the tool to be controlled by swinging the tool along an arc indicated by arrow 57 about the pivot 40 located below the cutting tool and the cutting assembly. When the correct rake is established, the releasable fastener 56 is tightened, locking brace sections 48, 54 together in the desired position. The brace can thus be thought of as an extensible member connected between the free end of the cutting assembly and the base. The screw 56 acts as a locking means to control the length of the extensible member for establishing the rake of the tool.

In addition to this mode of adjustment, the height and path of movement of the cutting head with respect to the workpiece is changed by pivoting the support plate 46 about horizontal axis 59 and then tightening the bolts 47, 49. This can be conveniently done by inserting a dial indicator micrometer between the top edge of the support plate 46 first adjacent the right side wall of the tire and then adjacent the left side wall of the tire. Once these dimensions are established, the support plate 46 is securely locked to backing plate 42. As already described, the angle of the cutting tool itself on a horizontal axis is established by turning the tool holder 90 about nut 92 and tightening the nut when the desired angle is achieved. Once these adjustments have been made, the motor 28 is started to turn the tires and the drum on rollers 26. The cutter is then advanced across the face of the tire.

The method of resurfacing tires will now be described with reference to FIGS. 4 through 7A. It is assumed that the tool has already been used to true the tire to approximately cylindrical shape in case it is out of round.

In FIG. 4, the position of the cutting tool 100 is shown at the point of beginning before the first cut. The first cut is made from right to left in this case along a line -a- which can also be thought of as the path of travel of the cutter. Line -a- is positioned at a slight angle ascending away from the workpiece typically about 0.010 inches for each ten inches of horizontal tool travel. As the tire rotates, the tool removes material from the outer surface of the tire (FIG. 5). However, as the operation proceeds, the tire settles onto the rollers 26, changing the configuration of the cut as shown greatly exaggerated in FIG. 6. At least two steps are used in making the finished surface. In the second step, shown in FIGS. 6 and 7, the tire surface is finished approximately by passing the tool again across the surface and preferably by moving the cutter 100 back across the cut surface in reverse direction to the point of beginning. Most preferably in the second step, the cutting tool 100 is again moved along the path -a-, i.e. without changing the path taken by the cutting tool in any way. While difficult to illustrate clearly in a diagram, the motion of the cutting tool in the second step is first across the cut section at the left edge of the tire. This will take away little material. However, near the center of the cut a considerable amount of material will be removed. However, since the tire is settling on the rollers 26, a substantially finished surface is formed which is parallel to the center axis of the tire. In a third step, a remaining crown b is removed by moving the cutter along the same path -a- from the point of beginning half way to the opposite edge. In summary, then, except at the beginning of the cut shown in FIG. 4, the tire settles on the supporting rolls throughout most of the cutting operation thereby cutting deeper at the end of the first pass to produce the elevated cut section shown at the left of FIG. 6. Accordingly, the center and right portion of the tire will be resting on the supporting rollers after the first cut. The first cut will, however, be fairly straight although ascending as seen in FIG. 6 because of the settling of the tire toward the rolls and the cutting tool. During the second or reverse cut shown in FIGS. 6 and 7, the tool will not be cutting much at first since its position has not been changed. As the cut proceeds, progressively greater amounts of material will be removed. As this happens, the workpiece will again begin to descend. The descent of the tire appears to occur throughout much of the cut. Then as the tire drops during the second cut, its outer surface conforms fairly closely to the shape of a cylinder. In the final cut, any remaining crown b is removed. It was discovered during the development of the invention that a straight cut, i.e. one that was parallel to the axis of drum rotation, produced a gap at the end of the first cut, i.e. the left side. Accordingly, with the tool moving on a downwardly sloped angle with respect to the axis of rotation, less material is removed near the terminal end of the cut. If a straight cut is used, i.e. one parallel to the axis of rotation, when cutting in the reverse direction (FIGS. 6 and 7), there is a tendency to form a crowned surface, i.e. one with a high center. This tendency is reduced by moving the tool back along the path -a- that descends toward the center of the workpiece. Most preferably, the path -a- taken by the tool in the second pass is the same as the path -a- taken during the first cut. The explanation of the method has for clarity been somewhat simplified. It will be understood by those skilled in the art that the tire surface will have to be trued up if out of round or to remove high spots before the "first", "second" and "third" cuts are made.

It can be seen that the invention efficiently produces a substantially smooth cylindrical surface parallel to the axis of rotation and without dismantling the machinery. The equipment can even be used for its intended purpose of processing rock asphalt or other material during the resurfacing operation. It should also be noted that the apparatus can be used in very confined spaces since the feed screw is accessible from both ends. If desired, the tool can be advanced automatically with the stepping motor 84. Both the rake of the tool and the path taken by the tool across the workpiece can be accurately determined independently and the latter changed and adjusted as needed without changing the rake since the support plate 42 will remain at the same angle with respect to the base 36 regardless of the position of plate 46. Moreover, the rollers 26 can be resurfaced with the same apparatus.

What is claimed is:

1. A tire resurfacing apparatus comprising a supporting base,
   the base is a member adapted to be secured to a framework supporting a workpiece that requires resurfacing,
   a backing plate mounted on the base,
   the backing plate has a free upper edge and a lower edge on the opposite side from the upper edge and the lower edge is pivotably connected to the base for moveably supporting the backing plate on the base to establish the rake of a cutting tool,
   a support plate on the backing plate and being supported thereby,
   releasable fastener means extending between the backing plate and the support plate for holding the plates together and for releasably securing them to one another in a desired position, said plates being pivotable relative to one another along an axis perpendicular to said pivot between the base and the support plate,
   an extensible brace member is operatively connected between the base and the upper free end of the support plate,
   releasable locking means is provided for controlling the length of the extensible member to regulate the rake of the tool, and the releasable fasteners enable the support plate to be releasably locked to the backing plate for changing the depth of cut and the path of the cut with respect to the base and the tire axis,
   a slide plate mounted for sliding motion on the support plate, screw means for advancing the slide plate laterally on the support plate, a tool holder on the slide plate, a cutting tool mounted on the tool holder and said tool holder including means for selectively moving the tool toward or away from the tire to control the depth of cut.

2. The apparatus of claim 1 wherein the tool holder and cutting tool is mounted upon the slide plate and a releasable locking means is provided for retaining the tool holder in a selected angular relationship on the slide plate for controlling the cutting angle of the tool.

3. The apparatus of claim 1 wherein journals are provided at each end of the support plate, a feed screw is mounted for rotation within the journals, said feed screw is threadedly connected to the slide plate, the feed screw extends through each journal and projects therefrom, a hand wheel is connected to each projecting end of the feed screw whereby the feed screw can be moved from either end to facilitate operation in a confined space.

4. The apparatus of claim 3 wherein a drive motor is operatively connected to the feed screw for automatically advancing the feed screw at a selected rate.

* * * * *